United States Patent
Jones (10) Patent No.: US 10,917,928 B2
(45) Date of Patent: Feb. 9, 2021

(54) CONTENT TRANSFER FUNCTIONALITY BEYOND OR WITHIN CELLULAR NETWORKS

(71) Applicant: Veea Systems Limited, Bath (GB)

(72) Inventor: Alan Edward Jones, Wiltshire (GB)

(73) Assignee: Veea Systems Limited, Bath and North East Somerset (GB)

( * ) Notice: Subject to any disclaimer, the term of this patent is extended or adjusted under 35 U.S.C. 154(b) by 0 days.

(21) Appl. No.: 15/459,908

(22) Filed: Mar. 15, 2017

(65) Prior Publication Data

US 2018/0270870 A1 Sep. 20, 2018

(30) Foreign Application Priority Data

Mar. 22, 2016 (GB) .................................. 1604878.7

(51) Int. Cl.
*H04W 76/14* (2018.01)
*H04L 29/08* (2006.01)
(Continued)

(52) U.S. Cl.
CPC ......... *H04W 76/14* (2018.02); *H04L 67/2857* (2013.01); *H04W 4/80* (2018.02);
(Continued)

(58) Field of Classification Search
CPC ....... H04W 76/14; H04W 4/80; H04W 4/008; H04W 48/10; H04W 76/023;
(Continued)

(56) References Cited

U.S. PATENT DOCUMENTS 9,699,767 B2 * 7/2017 Adachi ................. H04W 76/14
2010/0215024 A1 8/2010 Chiang
(Continued)

OTHER PUBLICATIONS

British Patent Application No. 61604878.7; Combined Search and Examination Report Under Sections 17 and 18(3) dated Sep. 30, 2016.
(Continued)

*Primary Examiner* — Ian N Moore
*Assistant Examiner* — Brian T Le
(74) *Attorney, Agent, or Firm* — Fitch, Even, Tabin & Flannery LLP (57) ABSTRACT

A wireless communication unit for communicating with a wireless network node and one or more wireless remote communication units is described. The wireless communication unit comprises: at least one receiver configured to receive data content when connected to the wireless network node or a first wireless remote communication unit; at least one memory operably coupled to the at least one receiver and configured to store the received data content; at least one transmitter operably coupled to the at least one memory; and a processor operably coupled to the at least one memory and the at least one transmitter. When no longer connected to the wireless network node or the first wireless remote communication unit, the processor is configured to access the data content from the at least one memory and the transmitter is configured to transmit the accessed data content to at least one second wireless remote communication unit.

14 Claims, 5 Drawing Sheets

(51) Int. Cl.
*H04W 48/10* (2009.01)
*H04W 4/80* (2018.01)
*H04W 88/06* (2009.01)
*H04W 84/22* (2009.01)
*H04W 88/04* (2009.01)

(52) U.S. Cl.
CPC ............ *H04W 48/10* (2013.01); *H04W 84/22* (2013.01); *H04W 88/04* (2013.01); *H04W 88/06* (2013.01)

(58) Field of Classification Search
CPC ..... H04W 88/06; H04W 84/22; H04W 88/04; H04L 67/2857
See application file for complete search history.

(56) References Cited

U.S. PATENT DOCUMENTS

2012/0157097 A1   6/2012   Cryderman
2017/0353819 A1*  12/2017  Yin .................... H04L 47/30

OTHER PUBLICATIONS

European Patent Application No. 17161092.6; Extended Search Report dated Jul. 24, 2017; 8 pages.
European Patent Application No. 17161092.6; Communication Pursuant to Article 94(3) EPC; dated Mar. 11, 2019.

* cited by examiner

CONTENT TRANSFER FUNCTIONALITY BEYOND OR WITHIN CELLULAR NETWORKS

RELATED APPLICATION(S)

This application claims the benefit of United Kingdom Application No. 1604878.7 filed Mar. 22, 2016. The content of this application is fully incorporated herein in its entirety.

TECHNICAL FIELD

The field of this invention relates generally to wireless communication units and methods for performing content transfer functionality beyond and within wireless cellular communication systems.

BACKGROUND

An evolution from the third generation (3G) wireless communications is the long term evolution (LTE) cellular communication standard, sometimes referred to as $4^{th}$ generation (4G) systems. Both of these technologies are compliant with third generation partnership project (3GPP™) standards. A conventional mobile cellular network is based on a star topology where the central node, referred to as an eNodeB in 3GPP™ parlance, is the cell site and the other nodes wirelessly connected to the central node are subscriber units, referred to as user equipment (UEs) in 3GPP™ parlance. The connection to the cell site is made via a wireless interface and is possible if the mobile device (or UE in 3GPP™) parlance are within wireless coverage of the cell.

A mobile cellular network consists of multiple cell sites that have overlapping coverage areas enabling UEs to roam across coverage areas supported by multiple eNodeBs whilst maintaining network connectivity. Within the network footprint a mobile cellular network is typically designed for 95% coverage; this means within the coverage area, 5% of locations are in outage with no service availability. These pockets of outage generally occur within buildings, where losses due to in-building penetration cause the mobile radio signal to be attenuated by tens of decibels. Outside the footprint there is no coverage provided by the mobile cellular network, and typically this would be in regions of low or sparse population density.

When outside of the cellular coverage footprint, the network connection is typically lost and the mobile user is unable to access content in a real-time manner, other than via repeater connectivity. It is known that networking with other devices that are also 'off-network' is possible using ad-hoc or peer-to-peer networking methods, this form of networking is normally referred to as 'mesh' networking. A mesh network is a network topology in which each node may relay data for the network, where all nodes may cooperate in the data distribution of the network.

The inventors of the present invention have identified a benefit for providing data content that is delay tolerant to communication units/end nodes when located outside of, say, a cellular network, and without real-time access to the cellular network or a wider IP network via the use of communication unit.

SUMMARY OF THE INVENTION

In a first aspect of the invention, a wireless communication unit for communicating with a wireless network node and one or more wireless remote communication units is described. The wireless communication unit comprises: at least one receiver configured to receive data content when connected to the wireless network node or a first wireless remote communication unit; at least one memory operably coupled to the at least one receiver and configured to store the received data content; at least one transmitter operably coupled to the at least one memory; and a processor operably coupled to the at least one memory and the at least one transmitter. When no longer connected to the wireless network node or the first wireless remote communication unit, the processor is configured to access the data content from the at least one memory and the transmitter is configured to transmit the accessed data content to at least one second wireless remote communication unit.

In this manner, a wireless remote communication unit may be able to provide data content that is delay tolerant to remote communication units when located outside of, say, a wireless network (either cellular or short-range, such as WiFi™), and without real-time access to the wireless network or a wider IP network via the use of communication unit.

In an optional example of the invention, the at least one receiver may receive a request for the data content from the second wireless remote communication unit when the mobile wireless communication unit is no longer connected to the wireless network node or first wireless remote communication unit, and the transmitter transmits the accessed data content to the second wireless remote communication unit in response thereto. In this manner, a wireless remote communication unit may be able to request data content irrespective of whether the wireless remote communication unit is within coverage of a wireless node, such as a cellular eNodeB or a WiFi™ access point.

In an optional example of the invention, the transmitter may be configured to broadcast or transmit a message to other wireless remote communication units when no longer connected to the wireless network node, indicating that the wireless communication unit is available for peer-to-peer communications. In this manner, a wireless communication unit may be able to advertise data content that it has stored to wireless remote communication units, irrespective of whether the wireless communication unit is within coverage of a wireless node, such as a cellular eNodeB or a WiFi™ access point.

In an optional example of the invention, the processor may be configured to access the data content from the at least one memory and the transmitter may be configured to transmit the accessed data content to a plurality of other wireless remote communication units in a batch mode. In this manner, a wireless communication unit may be able to transmit data content that it has stored to multiple wireless remote communication units in a batch mode of operation, irrespective of whether the wireless communication unit is within coverage of a wireless node, such as a cellular eNodeB or a WiFi™ access point.

In an optional example of the invention, the at least one transmitter may be configured to transmit the data content for a limited period of time. In this manner, a wireless communication unit may be able to transmit time-limited data content that it has stored to wireless remote communication units.

In a second aspect of the invention, a mobile wireless communication unit for communicating with a wireless network node and one or more wireless remote communication units is described. The mobile wireless communication unit comprises: at least one receiver configured to receive data content from at least one wireless remote communication unit when not connected to the wireless network node; at least one memory operably coupled to the at least one receiver and configured to store the received data content; at least one transmitter operably coupled to the at least one memory; and a processor operably coupled to the at least one memory and the at least one transmitter. When connected to the wireless network node or a further wireless remote communication unit, the processor is configured to access the data content from the at least one memory and the transmitter is configured to transmit the accessed data content to the wireless network node or the further wireless remote communication unit.

In this manner, a mobile wireless remote communication unit may be able to connect to, and receive and store data content that is delay tolerant as it passes remote communication units. When it is subsequently located inside of, say, a wireless network (either cellular or short-range, such as WiFi™), it is able to download/transmit the previously stored content to a wireless network node or the further wireless remote communication unit.

In an optional example of the invention, the transmitter may be configured to broadcast or transmit a message to a plurality of wireless remote communication units indicating that the mobile wireless communication unit requests the data content. In this manner, the mobile wireless communication unit may be able to request data content from multiple wireless remote communication units.

In an optional example of the invention, the receiver may be configured to receive the accessed data content from a plurality of other wireless remote communication units in a batch mode and the processor is configured to store the received data content in the at least one memory according to an identifier associated with the other wireless remote communication units. In this manner, the mobile wireless communication unit may be able to receive multiple copies of the data content from multiple wireless remote communication units in a batch mode, and identify the various copies with an identifier associated with the communication unit from which the respective copy was obtained.

In an optional example of the invention, the data content may be delay tolerant. In an optional example of the invention, the data content is received using a first technology and transmitted using a second different technology. In an optional example of the invention, the first technology may be a $3^{rd}$ generation partnership project technology and the second different technology may be a short range wireless technology. In an optional example of the invention, the first technology may be a short range wireless technology and the second different technology may be a $3^{rd}$ generation partnership project technology.

In an optional example of the invention, the processor may be arranged to configure the wireless remote communication unit as a peer-to-peer communication unit to support transfer of data packets to or from wireless remote communication units. In an optional example of the invention, the processor and transmitter may be configured to transmit a message to at least one wireless remote communication unit indicating one of the following: (i) the mobile wireless communication unit has data content available to be sent to the at least one wireless remote communication unit in a peer-to-peer manner; (ii) the mobile wireless communication unit wishes to receive data content from the at least one wireless remote communication unit in a peer-to-peer manner.

In a third aspect of the invention, an integrated circuit for a wireless communication unit for communicating with a wireless network node and one or more wireless remote communication units. The integrated circuit comprises: at least one receiver configured to receive data content when connected to the wireless network node or a first wireless remote communication unit; at least one memory operably coupled to the at least one receiver and configured to store the received data content; at least one transmitter operably coupled to the at least one memory; and a processor operably coupled to the at least one memory and the at least one transmitter. When no longer connected to the wireless network node or the first wireless remote communication unit, the processor is configured to access the data content from the at least one memory and the transmitter is configured to transmit the accessed data content to at least one second wireless remote communication unit.

In a fourth aspect of the invention, a method for sharing delay tolerant content between wireless communication units is described. The method comprises, at a wireless communication unit: receiving data content when connected to a wireless network node or a first wireless remote communication unit; storing the received data content; and when the wireless communication unit is no longer connected to the wireless network node or the first wireless remote communication unit, accessing the data content from the at least one memory, and transmitting the accessed data content to at least one second wireless remote communication unit.

In a fifth aspect of the invention, a non-transitory tangible computer program product comprising executable code stored therein for sharing delay tolerant content between wireless communication units is described. The code is operable for, when executed at a wireless communication unit: receiving data content when connected to a wireless network node or a first wireless remote communication unit; storing the received data content; and when the wireless communication unit is no longer connected to the wireless network node or the first wireless remote communication unit, accessing the data content from the at least one memory, and transmitting the accessed data content to at least one second wireless remote communication unit.

In a sixth aspect of the invention, an integrated circuit for a mobile wireless communication unit for communicating with a wireless network node and one or more wireless remote communication units is described. The integrated circuit comprises: at least one receiver configured to receive data content from at least one wireless remote communication unit when not connected to the wireless network node; at least one memory operably coupled to the at least one receiver and configured to store the received data content; at least one transmitter operably coupled to the at least one memory; and a processor operably coupled to the at least one memory and the at least one transmitter. When connected to the wireless network node or a further wireless remote communication unit, the processor is configured to access the data content from the at least one memory and the transmitter is configured to transmit the accessed data content to the wireless network node or the further wireless remote communication unit.

In a seventh aspect of the invention, a method for sharing delay tolerant content between devices is described. The method comprises, at a mobile wireless communication unit: receiving data content from at least one wireless remote communication unit when not connected to a wireless network node; storing the received data content; and when the mobile wireless communication unit is subsequently connected to the wireless network node, either direct or via one or more wireless remote communication units; accessing the data content from the at least one memory, and transmitting the accessed data content to the wireless network node or the further wireless remote communication unit.

In an eighth aspect of the invention, a non-transitory tangible computer program product comprising executable code stored therein for sharing delay tolerant content between devices is described. The code is operable for, when executed at a mobile wireless communication unit: receiving data content from at least one wireless remote communication unit when not connected to a wireless network node; storing the received data content; and when the mobile wireless communication unit is subsequently connected to the wireless network node, either direct or via one or more wireless remote communication units; accessing the data content from the at least one memory, and transmitting the accessed data content to the wireless network node or the further wireless remote communication unit.

In a ninth aspect of the invention, a wireless communication system that comprises multiple wireless communication units, wherein at least one wireless communication unit communicates with a wireless network node and one or more wireless remote communication units is described. The wireless communication unit comprises: at least one receiver configured to receive data content when connected to the wireless network node or a first wireless remote communication unit; at least one memory operably coupled to the at least one receiver and configured to store the received data content; at least one transmitter operably coupled to the at least one memory; and a processor operably coupled to the at least one memory and the at least one transmitter. When no longer connected to the wireless network node or the first wireless remote communication unit, the processor is configured to access the data content from the at least one memory and the transmitter is configured to transmit the accessed data content to at least one second wireless remote communication unit.

In a tenth aspect of the invention, a wireless communication system that comprises multiple wireless communication units, wherein at least one mobile wireless communication unit communicates with a wireless network node and one or more wireless remote communication units is described. The at least one mobile wireless communication unit comprises: at least one receiver configured to receive data content from at least one wireless remote communication unit when not connected to the wireless network node; at least one memory operably coupled to the at least one receiver and configured to store the received data content; at least one transmitter operably coupled to the at least one memory; and a processor operably coupled to the at least one memory and the at least one transmitter. When connected to the wireless network node or a further wireless remote communication unit, the processor is configured to access the data content from the at least one memory and the transmitter is configured to transmit the accessed data content to the wireless network node or the further wireless remote communication unit.

BRIEF DESCRIPTION OF THE DRAWINGS

Further details, aspects and embodiments of the invention will be described, by way of example only, with reference to the drawings. In the drawings, like reference numbers are used to identify like, or functionally similar, elements. Elements in the figures are illustrated for simplicity and clarity and have not necessarily been drawn to scale.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will be further appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Example embodiments of the present invention are described with respect to a mobile wireless communication unit performing any of a number of roles in a communication system, depending upon its capabilities, the prevailing communication conditions and its location. Example embodiments are described with reference to routing techniques within, say, a mesh network, whereas in some example embodiments flooding techniques may also be employed. Example embodiments describe, in general terms, a data ingress point for data content being provided to a wireless communication unit, within, or attached to, cellular coverage area. The wireless communication unit stores the data content and then transitions outside of the cellular coverage area for distribution of the data content to one or more other (remote) wireless communication units. In other example embodiments, a data ingress point for data content being provided to a wireless communication unit, may be provided outside (and not attached to) a cellular coverage area. The wireless communication unit stores the data content and then transitions inside of the cellular coverage area (or into a mesh network within, or attached to the cellular coverage area) for distribution of the data content to one or more other wireless communication units or a base station supporting the coverage cell.

In some examples, the term data content may comprise any form of data, including delay tolerant data (that is not necessary to be used or read immediately) and data traffic and any other information, in whatever form.

In some examples, a remote wireless communication unit may be configured to receive data content, e.g. in a form of data packets, within or connected to a cellular or IP network, for storing and potentially re-distributing, transmitting or broadcasting when located or mobile outside of cellular coverage. In some examples, the data content may be received using a first technology such as using a direct LTE™ technology, and thereafter potentially re-distributing the data content using another short-range technology, e.g. using a WiFi™ or Bluetooth™ technology (optionally encapsulated in a tunnel).

In some examples, when no longer connected to the wireless network node or other wireless remote communication unit, from which it received the data content, the remote wireless communication unit may configure itself for peer-to-peer communication in order to access the data content from its memory and subsequently transmit the accessed data content to at least one other wireless remote communication unit.

In some examples, examples of the invention may be employed in a reverse direction, for example where a mobile wireless communication unit may receive data content from one or multiple wireless remote communication unit(s) that are not connected to the wireless network node or other wireless remote communication unit. In this example, the mobile wireless communication unit may receive the data content when roaming outside of cellular coverage, but scheduled to return to cellular coverage. In this manner, the mobile wireless communication unit may configure itself for peer-to-peer communication in order to receive the data content and store the data content in memory for subsequent retrieval and transmitting to at least one other wireless remote communication unit or central node/base station connected to the cellular network.

Although examples of the invention are described with regard to a mobile wireless communication unit, such as a user equipment (UE), transitioning into and outside of mesh network and/or cellular coverage, it is envisaged that the concepts described herein may be employed by any communication unit with wireless capability that is capable of being configured for peer-to-peer communication.

Figure 1:
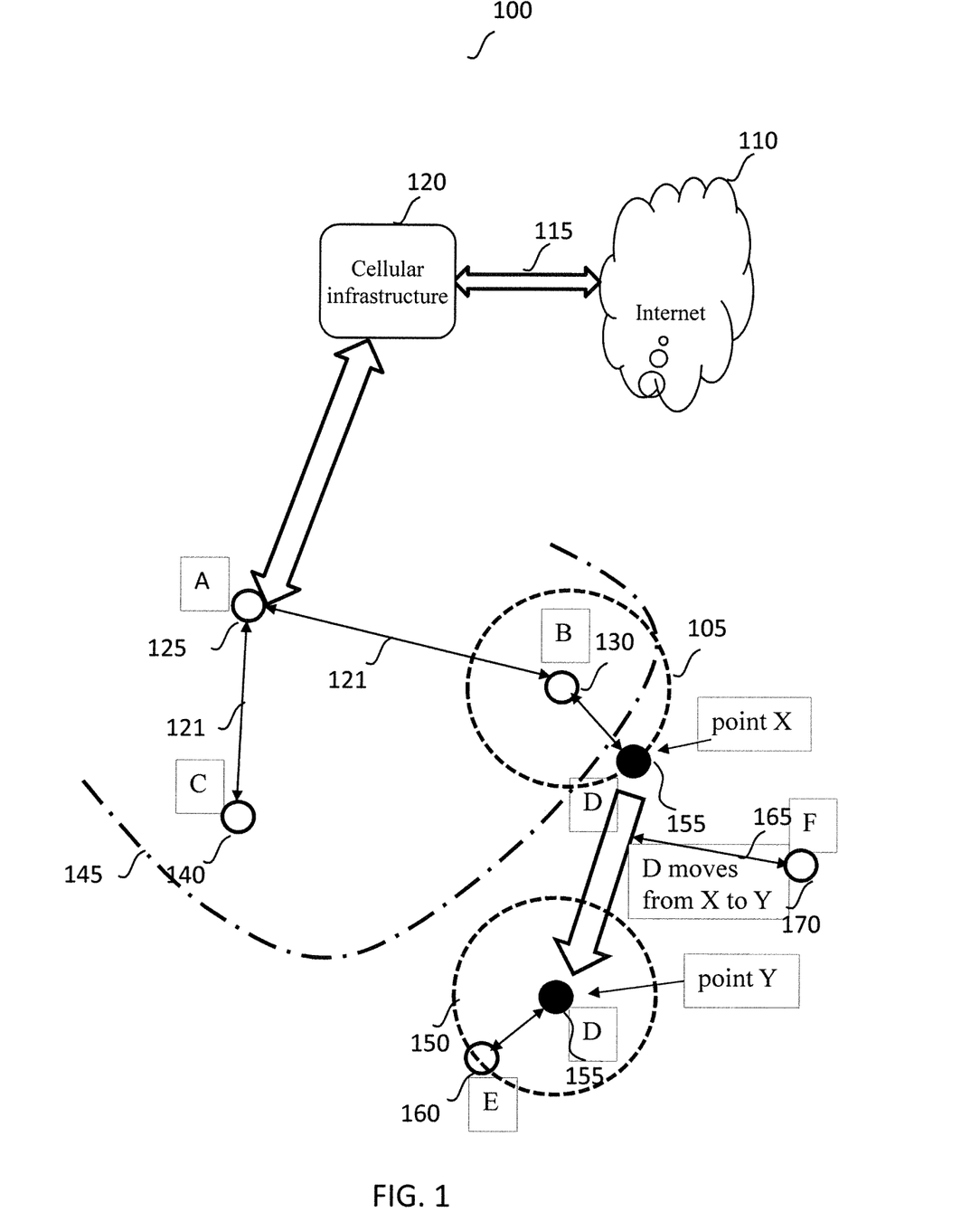
FIG. 1 illustrates an overview of a wireless communication system, whereby a wireless communication unit is located outside of a cellular coverage area and wishes to receive data content, adapted in accordance with some example embodiments of the present invention.

Referring now to FIG. 1, an overview of a wireless communication system 100 is illustrated. Wireless communication units 130 ('B') and 140 ('C') are located within the cellular coverage area 145 of the communication cell, and thus supported by a base station, such as eNodeB 125 ('A'). Although the base station is described with reference to an eNodeB 125 ('A'), it is envisaged that in other examples the base station may be any other suitable wireless communication node, such as a WiFi™ access point. Wireless communication units 130 ('B') and 140 ('C') receive data content from eNodeB 125 ('A'), and store the data content locally. In this example, LTE™ provides the wide area network coverage technology for the base station, such as eNodeB 125 ('A'). Thus, wireless communication units 130 ('B') and 140 ('C') communicate on an LTE™ bearer 121 with eNodeB 125 ('A') and thereafter into, or from, a cellular infrastructure 120, for example comprising a packet gateway (PGW) and service gateway (SGW) (not shown).

The cellular infrastructure 120 is connected 115 to a public network, such as the Internet 110, supporting Internet Protocol (IP) communication.

As illustrated, wireless communication units 155 ('D') and 160 ('E') are located outside of the cellular coverage area 145 of the communication cell. In some examples, wireless communication units 130 ('B'), 140 ('C'), 155 ('D') and 160 ('E') may be any combination of cellular phones, smartphones, Wi-Fi™ dongles or equivalent. As well as cellular connectivity using LTE™, it is assumed that wireless communication units 130 ('B'), 140 ('C'), 155 ('D') and 160 ('E') may support additional wireless connectivity in the form of Wi-Fi™ or Bluetooth™, or an equivalent technology such as 802.15.4 that can establish a peer-to-peer communication link.

In examples of the invention, wireless communication unit 130 ('B') uses WiFi™ for mesh connectivity between devices. Wireless communication unit 155 ('D') is located within the mesh network 105 provided by wireless communication unit 130 ('B'). In some examples, wireless communication unit 155 ('D') registers an interest to receive some or all data content received and stored locally by wireless communication unit 130 ('B'). Wireless communication unit 130 ('B') then re-transmits the stored data content using the additional mesh wireless connectivity, i.e. Wi-Fi™. Wireless communication unit 155 ('D') receives the transmission from wireless communication unit 130 ('B'), and also stores the received data content locally.

After a period of time, wireless communication unit 155 ('D') transitions from point 'X' to point 'Y'. In one example, wireless communication unit 155 ('D') may indicate in a flag that it is now out of cellular coverage. In one example, wireless communication unit 155 ('D') may switch on its peer-to-peer functionality by starting to transmit active beacons indicating that it has a stored version of the received data content.

In some examples of the invention, wireless communication unit 160 ('E') is also out of cellular coverage, but after wireless communication unit 155 ('D') moves from point 'X' to point 'Y' it comes within mesh coverage of wireless communication unit 155 ('D'). Using the stored data content that wireless communication unit 155 ('D') received from wireless communication unit 130 ('B'), and which wireless communication unit 130 ('B') received from wireless communication unit 125 ('A'), wireless communication unit 155 ('D') may advertise that it has the data content. Wireless communication unit 160 ('E') may be in a steady-state mode of operation whereby it searches for, say, active beacons from another wireless communication unit. In some examples, the beacon transmission may indicate that wireless communication unit 155 ('D') is functioning (or capable as functioning) in a peer-to-peer manner from which it is possible to receive or download particular data content. For example, wireless communication unit 160 ('E') may receive active beacon transmissions from wireless communication unit 155 ('D'), and in response thereto requests a peer-to-peer communication link be set up with wireless communication unit 155 ('D'). Following a register of interest in the data content by wireless communication unit 160 ('E'), wireless communication unit 155 ('D') may re-transmit the data content to wireless communication unit 160 ('E') in an established peer-to-peer communication.

In other examples, not shown, wireless communication unit 155 ('D') may receive the transmission of data content direct from wireless communication unit 125 ('A'), and store the received data content locally, before transitioning outside of the cellular coverage area.

In another example (not shown), if wireless communication unit 155 ('D') moved out of mesh coverage, it must stop forwarding data received on the mesh from the base station wireless communication unit 125 ('A') via the cellular connectivity, as it is no longer connected to wireless communication unit 125 ('A'). As such, wireless communication unit 155 ('D') must then transition its operational capabilities to function as an out of coverage device 245 that is able to offer peer-to-peer communications.

Thereafter, wireless communication unit 155 ('D') is configured for peer-to-peer communications in order to transmit the data content to wireless communication unit 160 ('E'). Wireless communication unit 160 ('E') receives the data content and either also stores it locally, consumes the data content or both.

In this manner, by employing the concept of obtaining data content whilst in coverage of wireless communication unit 125 ('A'), say via the LTE™ network or via wireless communication unit 130 ('B') using a short-range communication technology, such as Wi-Fi™ or Bluetooth™, or an equivalent technology such as 802.15.4, wireless communication unit 160 ('E') is able to receive data content without having a real-time network connection to wireless communication unit 125 ('A'), and thereafter an IP network. Thus, rather than establishing a continuous communications link between two end points, examples of the invention are able to deliver data content wireless communication units, device or end points using the natural movement of mobile devices and the local storing of content.

Further, in some examples, it will be understood that wireless communication units 130 ('B'), 140 ('C'), 155 ('D') and 160 ('E') can physically move around the network and pass on the data content to other wireless communication units in the network that have yet to store this data content. In this example, wireless communication unit 125 ('A') is effectively a data content ingression point, whereas in other examples it will be understood that other wireless communication units or nodes may additionally or alternatively be data content ingression points.

To explain one application or context of the examples described herein, let us consider a situation where a coffee shop may want to advertise its services by offering a voucher. Here, devices within cellular coverage receive the voucher, and store the data content locally within the device. As a device roams around the town, it transmits to other devices in the local vicinity that have the coffee shop app. notifying them of the availability of a voucher. If the user is interested, and registers the interest, the voucher is re-transmitted to the device of interest, and that device then also stores the voucher. This communication would be using peer-to-peer communication, such as Wi-Fi™, rather than cellular. Thus, in this manner, examples of the invention may be employed whether within or outside of cellular coverage, as when in coverage, the routing concepts herein described may provide improved efficiency than using a cellular network, as the communications are not having to traverse the mobile cellular network.

In some examples, it is envisaged that the data content may be relevant for a period of time, e.g. information provided before a concert or a sporting event commences. In such an example, it is envisaged that the transmitter may be configured to transmit the data content for a limited period of time, i.e. whilst the data content has value and is valid.

In some examples, it is also envisaged that the data content may be delay tolerant, i.e. it is not required urgently or in a time-critical sense. One example could be in a scenario where a shop voucher was validly for a future week or weekend. One example could also be the latest news of the day.

In some examples, a predefined algorithm may be employed for turning on beacons or broadcast messages using WiFi™ for wireless communication units that have downloaded data content and are able to further transmit the data content using peer-to-peer communication. Other nodes/wireless communication units would then listen for the beacon(s) or broadcast messages and, if interested in the publicised data content, register an interest to receive the data content from the wireless communication unit using peer-to-peer communication.

In some examples of the invention, multi-hop peer-to-peer functionality of the data content is envisaged for wireless communication units that are outside of cellular coverage. For example, once wireless communication unit 160 ('E') has received the data content from wireless communication unit 155 ('D'), wireless communication unit 160 ('E') may then offer peer-to-peer communication to other nodes/wireless communication units to re-transmit the data content.

Figure 2:
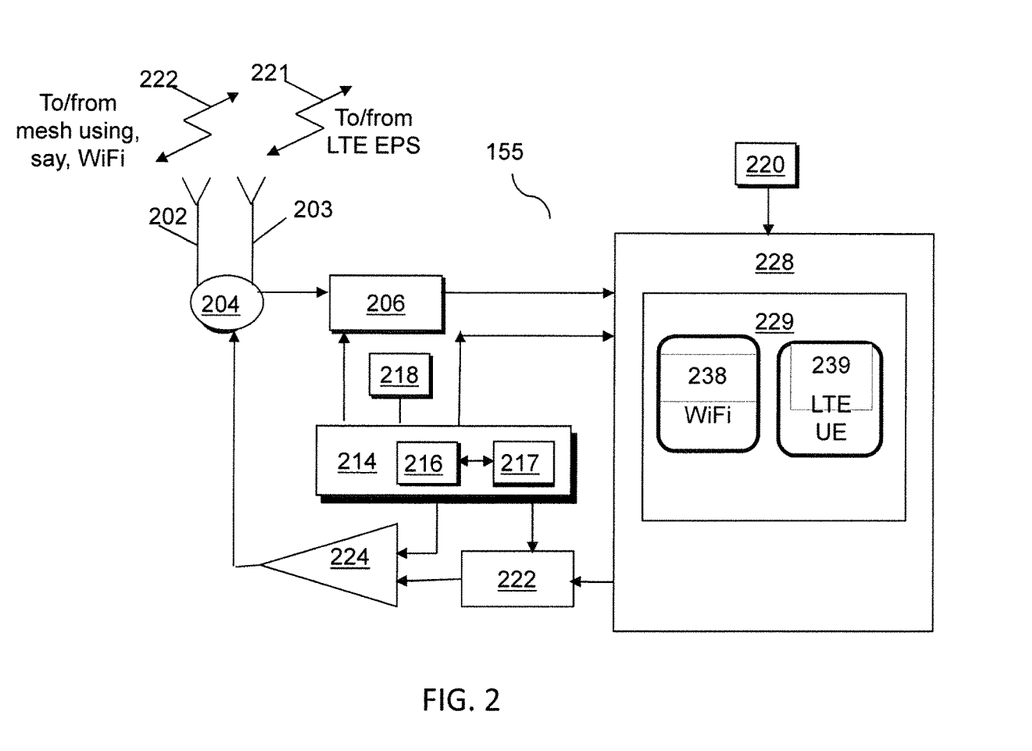
FIG. 2 illustrates a block diagram of a wireless communication unit, located and mobile outside of a cellular coverage area, adapted in accordance with some example embodiments of the present invention.

Referring now to FIG. 2, a block diagram of a wireless communication unit, adapted in accordance with some example embodiments of the invention, is shown. In practice, purely for the purposes of explaining embodiments of the invention, the wireless communication unit is described in terms of a wireless subscriber communication unit 155, such as a user equipment (UE). The wireless communication unit 155 contains an antenna 203, for receiving/transmitting LTE™ cellular transmissions 221, and an antenna 202, for receiving/transmitting short range communications, such as WiFi™ 222. The antennae 202, 203 are coupled to an antenna switch or duplexer 204, which provides isolation between receive and transmit chains within the wireless communication unit 155, for example that may additionally provide isolation between LTE™ and WiFi™ circuitry.

One or more receiver chains, as known in the art, include receiver front-end circuitry 206 (effectively providing reception, filtering and intermediate or base-band frequency conversion). The receiver front-end circuitry 206 is coupled to a signal processor 228 (generally realized by a digital signal processor (DSP)). A skilled artisan will appreciate that the level of integration of receiver circuits or components may be, in some instances, implementation-dependent.

A controller 214 maintains overall operational control of the wireless communication unit 155. The controller 214 is coupled to the receiver front-end circuitry 206 and the signal processor 228. In some examples, the controller 214 is also coupled to a memory, such as random access memory, 217 configured to store data content and a memory device 216 that selectively stores operating regimes, such as decoding/encoding functions, synchronization patterns, code sequences, and the like. A timer 218 is operably coupled to the controller 214 to control the timing of operations (e.g. transmission or reception of time-dependent signals) within the wireless communication unit 155.

As regards the transmit chain, this essentially includes an input module 220, coupled in series through signal processor 228 that may process and formulate input data for transmission to transmitter/modulation circuitry 222 and thereafter a power amplifier 224 to the antenna 202, 203 antenna array, or plurality of antennas. The transmitter/modulation circuitry 222 and the power amplifier 224 are operationally responsive to the controller 214.

In accordance with example embodiments, signal processor 328 of wireless communication unit 155 has been configured to support both WiFi™ and LTE™ operation. In some examples, a signal processor 238 supporting WiFi™ may be implemented as distinct from the signal processor 239 supporting LTE™, as shown. Alternatively, a single processor may be used to support both WiFi™ and LTE™ operation. In some examples, the transmitter and/or receiver circuit may be duplicated, one dedicated for LTE™ operation and one dedicated for WiFi™ operation. Clearly, the various components within the wireless communication unit 155 can be realized in discrete or integrated component form, with an ultimate structure therefore being an application-specific or design selection.

In accordance with example embodiments, the receiver 206 of the wireless communication unit 155 may be configured to receive data content when connected to the at least one of: a wireless network node, such as wireless communication unit 125 ('A') in FIG. 1, wireless remote communication units, e.g. from wireless communication unit 130 ('B') at antenna 202 over the WiFi (mesh) network 105.

The at least one memory 216, operably coupled to the at least one receiver 206, is configured to store the received data content. In some examples, the transmitter may also be configured to broadcast or transmit a message to other wireless remote communication units when no longer connected to the wireless network node, where the message indicates that the wireless remote communication unit contains the data content. When wireless communication unit 155 is no longer connected to the wireless network node, the signal processor 228 is configured to access the data content from the at least one memory and the transmitter is configured to transmit the accessed data content to at least one wireless remote communication unit. In some examples, the transmitter may be configured to transmit the accessed data content to a plurality of other wireless remote communication units, say in a batch mode of operation.

In some examples, the transmission of the accessed data content to at least one wireless remote communication unit may be made upon receipt of a request for such data content from the at least one wireless remote communication unit.

In some examples, the data content may be time limited, e.g. relating a news item for a particular day or relating to a time limited offer. In this example, the transmitter may be configured to transmit the data content for a limited period of time.

In this example, the data content may be received using a first technology, e.g. which may be a short range wireless technology such as WiFi™, and ultimately transmitted using a second different technology, e.g. which may be a $3^{rd}$ generation partnership project technology such as LTE™.

In some examples, in order to support the movement of data content as described above, the wireless communication unit 155 may re-configure itself for peer-to-peer communication to support transfer of data packets to or from wireless remote communication units.

Figure 3:
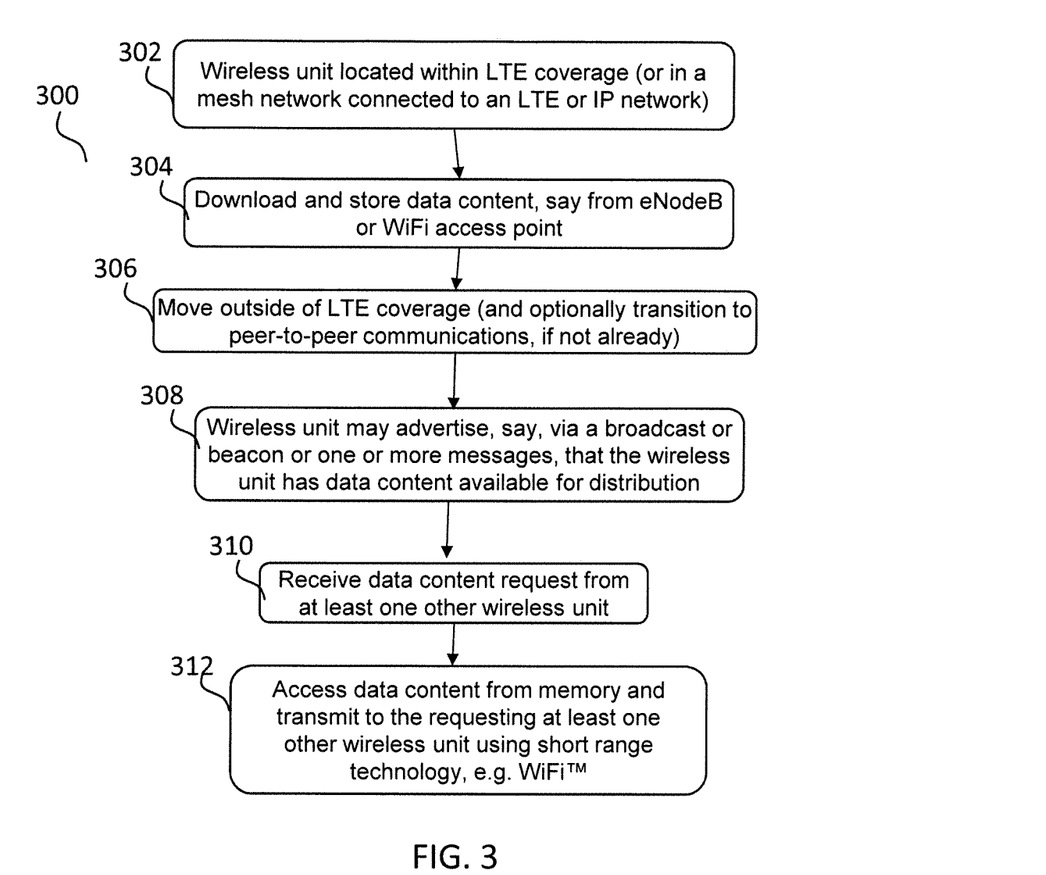
FIG. 3 illustrates an example flowchart of a wireless communication unit, for example operating in FIG. 1, in accordance with some example embodiments of the present invention.

Referring now to FIG. 3, an example flowchart 300 illustrates a wireless communication unit, for example operating in FIG. 1, and adapted in accordance with some example embodiments of the present invention. The example flowchart 300 comprises, in 302, a mobile wireless communication unit located within LTE coverage (or in a mesh network connected to an LTE or IP network). In 304, the mobile wireless communication unit downloads and stores data content from, say, a wireless communication node, such as an eNodeB. Although the wireless communication node is described with reference to an eNodeB, it is envisaged that in other examples the wireless communication node may be any other suitable wireless device, such as a WiFi™ access point. In 306, the mobile wireless communication unit moves outside of LTE™ coverage (and optionally transitions to peer-to-peer communications, if not already). In 308, mobile wireless communication unit may advertise, say, via a broadcast or beacon or one or more messages, that the mobile wireless communication unit has data content available for distribution. In 310, the mobile wireless communication unit receives a data content request from at least one other wireless unit. In response thereto, in 312, the mobile wireless communication unit accesses the data content from memory and transmits the data content to the requesting at least one other wireless unit using short range technology, e.g. WiFi™.

It will also be understood that in some scenarios examples of the invention may be employed when all devices are within cellular coverage. In such examples, some benefits result from alleviating the congestion on cellular network, whilst simultaneously providing a better user experience as the data content does not have to traverse the mobile network.

Figure 4:
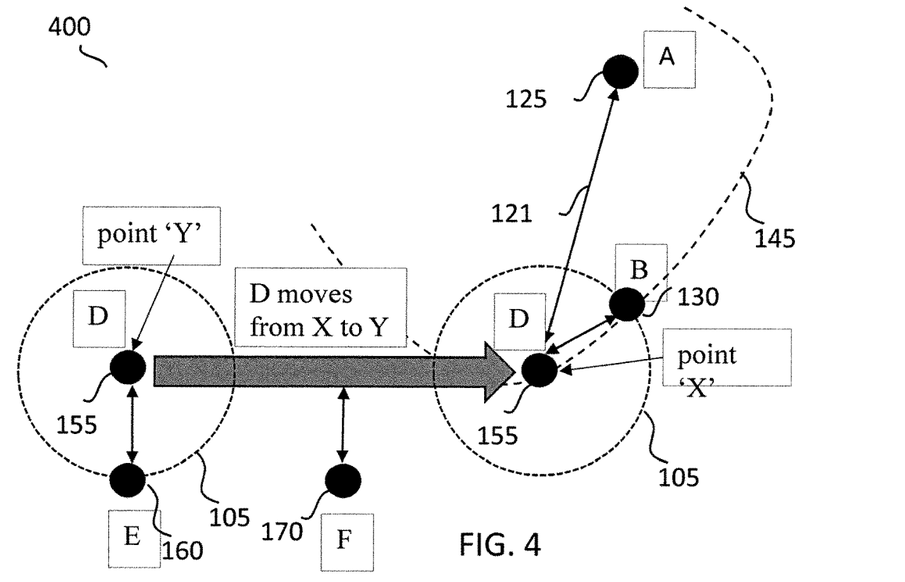
FIG. 4 illustrates an overview of a wireless communication system, whereby a wireless communication unit is located outside of a cellular coverage area of a communication cell supported by a base station, adapted in accordance with some example embodiments of the present invention.

In other examples, and referring now to FIG. 4, it is envisaged that the data content, collection, storage and delivery may also operate in a reverse direction. In a reverse direction, wireless communication unit 160 ('E') may transmit data content to wireless communication unit 155 ('D') at point 'Y'. Wireless communication unit 155 ('D') stores the received data content and may then move to point 'X'. At point 'X', and identifying that it is within range of wireless communication unit 130 ('B'), wireless communication unit 155 ('D') may re-transmit its stored data content (received from wireless communication unit 160 ('E')) to wireless communication unit 135 ('B'). Wireless communication unit 130 ('B') may receive and consume the data content, or store the data content locally and then subsequently send the data content to wireless communication unit 125 ('A'). In this reverse direction example, wireless communication unit 160 ('E') may be considered as the ingress point for the data content.

In another reverse direction example and in a similar manner, as illustrated, if at point 'X', wireless communication unit 155 ('D') identifies that it is within range of wireless communication unit 125 ('A'), i.e. a base station in a cellular network, wireless communication unit 155 ('D') may re-transmit its stored data content (received from wireless communication unit 160 ('E')) direct to wireless communication unit 125 ('A'). In this example, wireless communication unit 160 ('E') may again be considered as the ingress point for the data content.

To explain one application or context of the reverse direction example, as described herein, let us consider a situation where, say one or more meter reading(s) may need to be reported. Here, wireless communication unit 160 ('E') may be connected to a utility meter. Thereafter, a meter reading technician or vehicle that includes wireless communication unit 155 ('D') may pass nearby. Upon recognizing the vicinity of the wireless communication unit 155 ('D') and the wireless communication unit 160 ('E'), a peer-to-peer communication link may be set up there between. The meter reading may then be communicated to the wireless communication unit 155 ('D'). The meter reading technician or vehicle that includes wireless communication unit 155 ('D') may then move within coverage of a device that is in coverage of a cell site or access point, such as wireless communication unit 135 ('B'), e.g. when returning to the depot. Following a return to the depot, wireless communication unit 135 ('B') may transmit the data content to the cellular infrastructure network, which in some examples may be via base station wireless communication unit 125 ('A').

Alternatively, in this example, when wireless communication unit 155 ('D') moves to within coverage of wireless communication unit 125 ('A'), wireless communication unit 155 ('D') may transmit all of the collected data content (e.g. multiple meter readings) direct to wireless communication unit 125 ('A'), rather than via wireless communication unit 135 ('B').

In accordance with this example embodiment in a reverse direction, and referring back to FIG. 2, the receiver 206 of the wireless communication unit 155 may be configured to receive data content from at least one wireless remote communication unit when not connected to the wireless network node, e.g. from wireless communication unit 160 ('E') at antenna 202 over the WiFi (mesh) network 105. The at least one memory 216, operably coupled to the at least one receiver 206, is configured to store the received data content. When wireless communication unit 155 is connected to the wireless network node, or a further wireless remote communication unit is connected to the wireless network node, the signal processor 228 is configured to access the data content from the at least one memory and the transmitter is configured to transmit the accessed data content to at least one of: the wireless network node, the further wireless remote communication unit.

In some examples, it is envisaged that the receiver may be configured to receive the accessed data content from a plurality of wireless remote communication units, say in a batch mode of operation, in order to collect data content therefrom. For example, in this reverse direction, it is envisaged that wireless communication unit 155 ('D') may be configured to obtain a batch of data content, e.g. multiple meter readings, from multiple wireless communication units 160 ('E'). For example, in a similar manner to above, a meter reading may also be communicated from wireless communication unit 170 ('F') to the wireless communication unit 155 ('D'), whilst the wireless communication unit 155 ('D') is mobile and, say, returning to a location within, or coupled to, LTE™ coverage. In some examples, the meter readings may include an identifier to distinguish that specific meter reading from other meter readings collected by wireless communication unit 155 ('D').

Furthermore, and referring back to FIG. 1, it will also be understood that the invention for batch mode may operate in the other direction, where wireless communication unit 125 ('A') receives specific data content to be distributed to one or more of wireless communication units 130 ('B'), 140 ('C'), 155 ('D'), 160 ('E'), and 170 ('F'). As wireless communication unit 155 ('D') moves from point 'X' to point 'Y', wireless communication unit 155 ('D') may be configured to transmit 165 the relevant data content to the wireless communication units 170 ('F'), and 160 ('E').

In some examples, such batch peer-to-peer transmissions may be performed through some form of ciphering flooding technique. In a ciphering flooding technique example, a packet is ciphered, and may be transmitted to lots of different nodes using flooding techniques. Advantageously, only those devices that have (or have previously received) the relevant keys will be in a position to be able to decipher the packet. Alternatively, batch peer-to-peer transmissions may be performed by first identifying a particular wireless communication unit and then transmitting the relevant data content to the identified wireless communication unit, once identification and a peer-to-peer communication link has been established.

Figure 5:
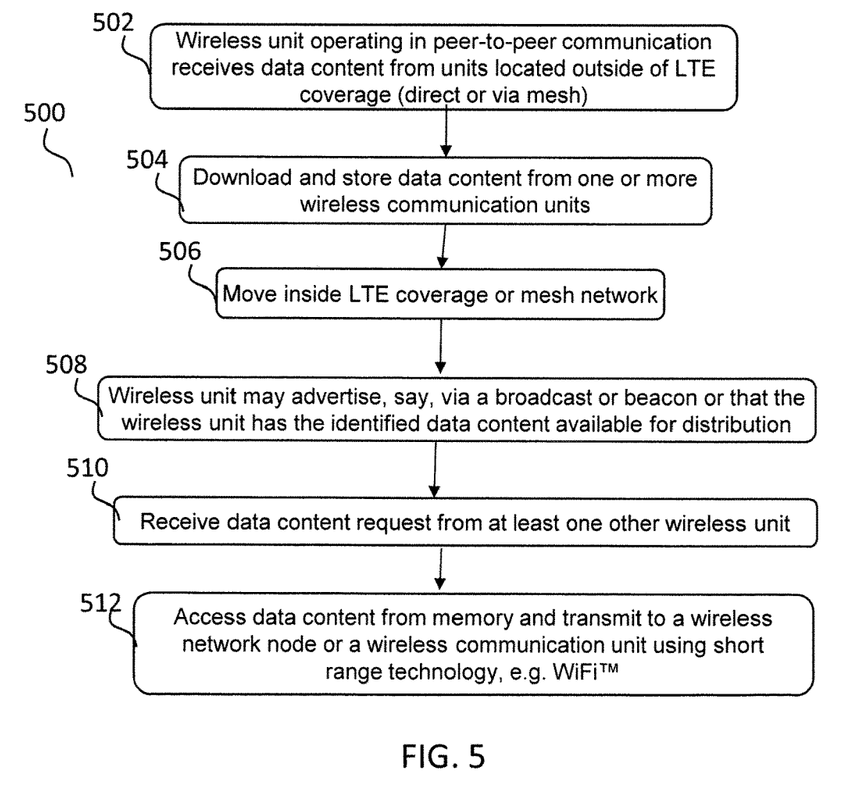
FIG. 5 illustrates an example flowchart of a wireless communication unit, for example operating in FIG. 4, in accordance with some example embodiments of the present invention.

Referring now to FIG. 5, an example flowchart 500 of a wireless communication unit, for example operating in FIG. 4, and adapted in accordance with some example embodiments of the present invention. The example flowchart 500 comprises, in 502, a mobile wireless communication unit located outside of LTE coverage (and not connected in a mesh network to an LTE or IP network) operating in a peer-to-peer communication and receiving data content from one or more wireless remote communication units. In 504, the mobile wireless communication unit stores the received data content. In 506, the mobile wireless communication unit moves inside of LTE™ coverage, or within a mesh network that supports on-going cellular connectivity (and optionally transitions from peer-to-peer communications, if not already). In 508, mobile wireless communication unit may advertise or notify, say, via a broadcast or beacon or unicast transmissions, that the mobile wireless communication unit has data content available for distribution or delivery. In 510, the mobile wireless communication unit receives a data content request from at least one other wireless communication node, e.g. an eNodeB or WiFi™ access point. In response thereto, in 512, the mobile wireless communication unit accesses the data content from memory and transmits the data content to the eNodeB or WiFi™ access point using short range technology, e.g. WiFi™.

Figure 6:
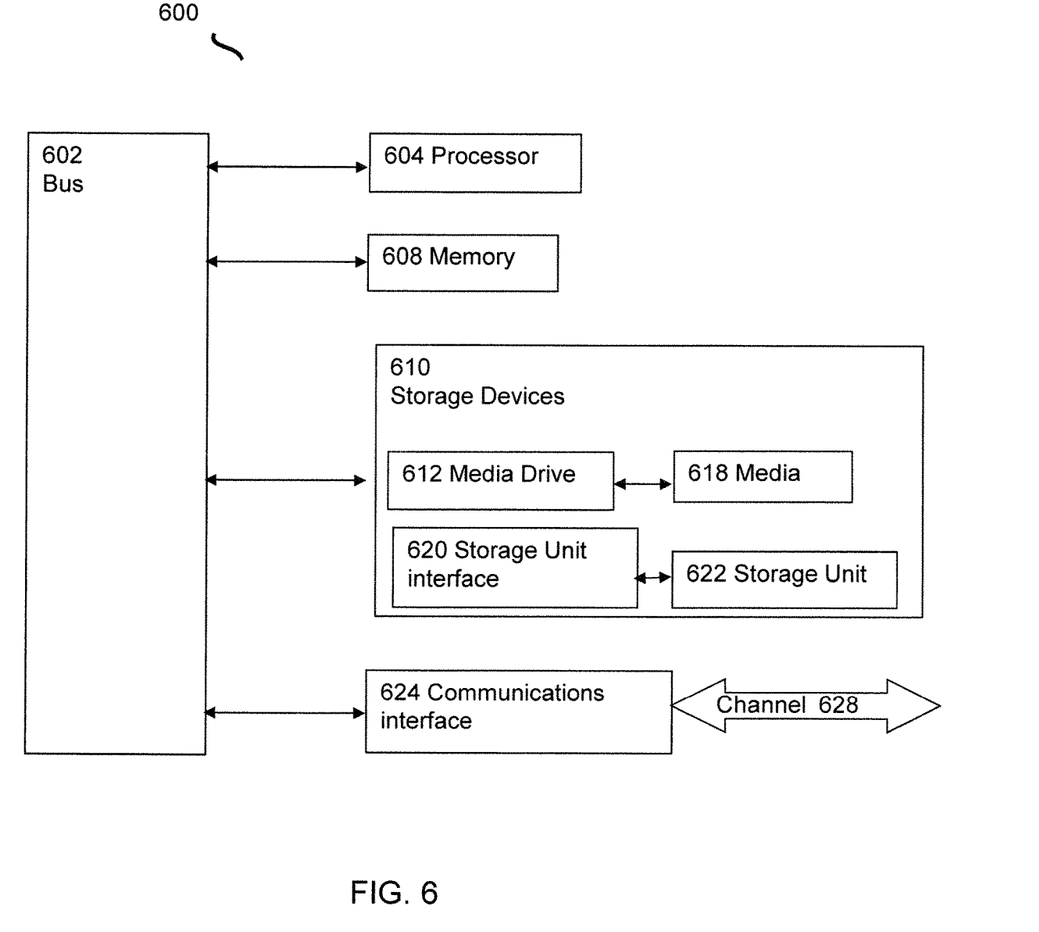
FIG. 6 illustrates a typical computing system that may be employed a wireless communication unit to perform an enforcement role in accordance with some example embodiments of the invention.

Referring now to FIG. 6, there is illustrated a typical computing system 600 that may be employed to implement software controlled switching between a first mode of operation where a backhaul link may be available and a second mode of operation where a backhaul link may not be available in some example embodiments of the invention. Computing systems of this type may be used in wireless communication units. Those skilled in the relevant art will also recognize how to implement the invention using other computer systems or architectures. Computing system 600 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 600 can include one or more processors, such as a processor 604. Processor 604 can be implemented using a general or special-purpose processing engine such as, for example, a microprocessor, microcontroller or other control logic. In this example, processor 604 is connected to a bus 602 or other communications medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory (ROM) or other static storage device coupled to bus 602 for storing static information and instructions for processor 604.

The computing system 600 may also include information storage system 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 618 may include, for example, a hard disk, floppy disk, magnetic tape, optical disk, CD or DVD, or other fixed or removable medium that is read by and written to by media drive 612. As these examples illustrate, the storage media 618 may include a computer-readable storage medium having particular computer software or data stored therein.

In alternative embodiments, information storage system 610 may include other similar components for allowing computer programs or other instructions or data to be loaded into computing system 600. Such components may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a universal serial bus (USB) port), a PCMCIA slot and card, etc. Software and data transferred via communications interface 624 are in the form of signals which can be electronic, electromagnetic, and optical or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product', 'computer-readable medium' and the like may be used generally to refer to media such as, for example, memory 608, storage device 618, or storage unit 622. These and other forms of computer-readable media may store one or more instructions for use by processor 604, to cause the processor to perform specified operations. Such instructions, generally referred to as 'computer program code' (which may be grouped in the form of computer programs or other groupings), when executed, enable the computing system 600 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 600 using, for example, removable storage drive 622, drive 612 or communications interface 624. The control logic (in this example, software instructions or computer program code), when executed by the processor 604, causes the processor 604 to perform the functions of the invention as described herein.

It will be further appreciated that, for clarity purposes, the described embodiments of the invention with reference to different functional units and processors may be modified or re-configured with any suitable distribution of functionality between different functional units or processors is possible, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. For example, the software may reside on non-transitory computer program product comprising executable program code to increase coverage in a wireless communication system.

In one example, non-transitory tangible computer program product comprising executable code stored therein may be used for sharing delay tolerant content between wireless communication units. The executable program code may be operable for, when executed at a wireless communication unit: receiving data content when connected to a wireless network node or a first wireless remote communication unit; storing the received data content; and when the wireless communication unit is no longer connected to the wireless network node or the first wireless remote communication unit, accessing the data content from the at least one memory, and transmitting the accessed data content to at least one second wireless remote communication unit.

In a further example, non-transitory tangible computer program product comprising executable code stored therein may be used for sharing delay tolerant content between wireless communication units. The executable program code may be operable for, when executed at a mobile wireless communication unit: receiving data content from at least one wireless remote communication unit when not connected to a wireless network node; storing the received data content; and when the mobile wireless communication unit is subsequently connected to the wireless network node, either direct or via one or more wireless remote communication units; accessing the data content from the at least one memory, and transmitting the accessed data content to the wireless network node or the further wireless remote communication unit.

Thus, the elements and components of an embodiment of the invention may be physically, functionally and logically implemented in any suitable way. Indeed, the functionality may be implemented in a single unit, in a plurality of units or as part of other functional units. Those skilled in the art will recognize that the functional blocks and/or logic elements herein described may be implemented in an integrated circuit for incorporation into one or more of the communication units.

In a first example of an integrated circuit, the integrated circuit may be suitable for a wireless communication unit for communicating with a wireless network node and one or more wireless remote communication units. The integrated circuit comprises: at least one receiver configured to receive data content when connected to the wireless network node or a first wireless remote communication unit; at least one memory operably coupled to the at least one receiver and configured to store the received data content; at least one transmitter operably coupled to the at least one memory; and a processor operably coupled to the at least one memory and the at least one transmitter. When no longer connected to the wireless network node or the first wireless remote communication unit, the processor is configured to access the data content from the at least one memory and the transmitter is configured to transmit the accessed data content to at least one second wireless remote communication unit.

In a second example of an integrated circuit, the integrated circuit may be suitable for a mobile wireless communication unit for communicating with a wireless network node and one or more wireless remote communication units is described. The integrated circuit comprises: at least one receiver configured to receive data content from at least one wireless remote communication unit when not connected to the wireless network node; at least one memory operably coupled to the at least one receiver and configured to store the received data content; at least one transmitter operably coupled to the at least one memory; and a processor operably coupled to the at least one memory and the at least one transmitter. When connected to the wireless network node or a further wireless remote communication unit, the processor is configured to access the data content from the at least one memory and the transmitter is configured to transmit the accessed data content to the wireless network node or the further wireless remote communication unit.

Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

I claim:

1. A wireless communication unit comprising:
    at least one receiver configured to receive data content when connected to a wireless network node or configured to receive the data content when located outside of cellular coverage of the wireless network node and connected to a first wireless remote communication unit having the data content;
    at least one memory operably coupled to the at least one receiver and configured to store the received data content;
    at least one transmitter operably coupled to the at least one memory; and
    a processor operably coupled to the at least one memory and the at least one transmitter;
    wherein, when no longer connected to the wireless network node and not connected to the first wireless remote communication unit, the processor is configured to access the data content from the at least one memory and the transmitter is configured to broadcast a message to at least one second wireless remote communication unit indicating that the wireless communication unit has downloaded the data content, the at least one receiver receives a request for the data content from the at least one second wireless remote communication unit, and the transmitter transmits the accessed data content to the at least one second wireless remote communication unit in response thereto using peer-to-peer communications.

2. The wireless communication unit of claim 1, wherein the processor is configured to access the data content from the at least one memory and the transmitter is configured to transmit the accessed data content to a plurality of second wireless remote communication units in a batch mode.

3. The wireless communication unit of claim 1, wherein the at least one transmitter is configured to transmit the data content for a limited period of time.

4. A mobile wireless communication unit for communicating with a wireless network node and one or more wireless remote communication units, the mobile wireless communication unit comprising:
    at least one receiver configured to receive data content from at least one wireless remote communication unit when located outside of cellular coverage and not connected to the wireless network node and configured to receive the data content from a plurality of other wireless remote communication units in a batch mode;
    at least one memory operably coupled to the at least one receiver and configured to store the received data content;
    at least one transmitter operably coupled to the at least one memory; and
    a processor operably coupled to the at least one memory and the at least one transmitter and configured to store the received data content in the at least one memory according to an identifier associated with the other wireless remote communication units;
    wherein, when connected to the wireless network node or a further wireless remote communication unit, the processor is configured to access the data content from the at least one memory and the transmitter is configured to transmit the accessed data content to the wireless network node or the further wireless remote communication unit.

5. The mobile wireless communication unit of claim 4, wherein the transmitter is configured to broadcast or transmit a message to a plurality of wireless remote communication units indicating that the mobile wireless communication unit requests the data content.

6. The mobile wireless communication unit of claim 4, wherein the data content is delay tolerant.

7. The mobile wireless communication unit of claim 4, wherein the data content is received using a first technology and transmitted to other wireless remote communication units using a second different technology.

8. The mobile wireless communication unit of claim 7, wherein the technologies are one from:

(i) the first technology is a 3rd generation partnership project technology and the second different technology is a short range wireless technology;
(ii) the first technology is a short range wireless technology and the second different technology is a 3rd generation partnership project technology.

9. The mobile wireless communication unit of claim 4, wherein the processor is arranged to configure the wireless remote communication unit as a peer-to-peer communication unit to support transfer of data packets to or from wireless remote communication units.

10. The mobile wireless communication unit of claim 4, wherein the processor and transmitter are configured to transmit a message to at least one other wireless remote communication unit indicating one of the following:
(i) the mobile wireless communication unit has data content available to be sent to the at least one other wireless remote communication unit in a peer-to-peer manner;
(ii) the mobile wireless communication unit wishes to receive data content from the at least one wireless remote communication unit in a peer-to-peer manner.

11. A method for sharing delay tolerant content between wireless communication units, the method comprising, at a wireless communication unit:
receiving data content when connected to a wireless network node or receiving the data content when located outside of cellular coverage of the wireless network node and connected to a first wireless remote communication unit having the data content;
storing the received data content in at least one memory; and
when the wireless communication unit is no longer connected to the wireless network node and not connected to the first wireless remote communication unit,
broadcasting a message to at least one second wireless remote communication unit indicating that the wireless communication unit has downloaded the data content;
receiving a request for the data content from the at least one second wireless remote communication unit;
accessing the data content from the at least one memory; and
transmitting the accessed data content to at least one second wireless remote communication unit in response thereto using peer-to-peer communications.

12. A method for sharing delay tolerant content between devices, the method comprising, at a mobile wireless communication unit:
receiving data content from at least one wireless remote communication unit when located outside of cellular coverage and not connected to a wireless network node and receiving the data content from a plurality of other wireless remote communication units in a batch mode;
storing the received data content in the at least one memory according to an identifier associated with the other wireless remote communication units;
and when the mobile wireless communication unit is subsequently connected to the wireless network node, either direct or via one or more wireless remote communication units;
accessing the data content from the at least one memory; and
transmitting the accessed data content to the wireless network node or the further wireless remote communication unit.

13. A wireless communication system that comprises multiple wireless communication units, wherein at least one wireless communication unit communicates with a wireless network node and one or more wireless remote communication units, wherein the at least one wireless communication unit comprises:
at least one receiver configured to receive the data content when connected to the wireless network node or receive data content when located outside of cellular coverage of the wireless network node and connected to a first wireless remote communication unit having the data content;
at least one memory operably coupled to the at least one receiver and configured to store the received data content;
at least one transmitter operably coupled to the at least one memory; and
a processor operably coupled to the at least one memory and the at least one transmitter;
wherein, when no longer connected to the wireless network node and not connected to the first wireless remote communication unit, the processor is configured to access the data content from the at least one memory and the transmitter is configured to broadcast a message to at least one second wireless remote communication units indicating that the wireless communication unit has downloaded the data content, the at least one receiver receives a request for the data content from the at least one second wireless remote communication unit, and the transmitter transmits the accessed data content to the at least one second wireless remote communication unit in response thereto using peer-to-peer communications.

14. A wireless communication system that comprises multiple wireless communication units, wherein at least one mobile wireless communication unit communicates with a wireless network node and one or more wireless remote communication units, wherein the at least one mobile wireless communication unit comprises:
at least one receiver configured to receive data content from at least one wireless remote communication unit when located outside of cellular coverage and not connected to the wireless network node and configured to receive the data content from a plurality of other wireless remote communication units in a batch mode;
at least one memory operably coupled to the at least one receiver and configured to store the received data content;
at least one transmitter operably coupled to the at least one memory; and
a processor operably coupled to the at least one memory and the at least one transmitter and configured to store the received data content in the at least one memory according to an identifier associated with the other wireless remote communication units;
wherein, when connected to the wireless network node or a further wireless remote communication unit, the processor is configured to access the data content from the at least one memory and the transmitter is configured to transmit the accessed data content to the wireless network node or the further wireless remote communication unit.

* * * * *